United States Patent
Munk-Hansen et al.

(10) Patent No.: US 10,626,851 B2
(45) Date of Patent: Apr. 21, 2020

(54) WIND TURBINE HAVING AN ACCESS ARRANGEMENT FOR A NACELLE

(71) Applicant: Siemens Gamesa Renewable Energy A/S, Brande (DK)

(72) Inventors: Thorkil Munk-Hansen, Fredericia (DK); Hans Kjaer Blaabjerg, Horsens (DK); Dennis Suhr Thoegersen, Stouby (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 0 days.

(21) Appl. No.: 16/118,921

(22) Filed: Aug. 31, 2018

(65) Prior Publication Data

US 2019/0072078 A1 Mar. 7, 2019

(30) Foreign Application Priority Data

Sep. 4, 2017 (EP) .................................. 17189236

(51) Int. Cl.
*F03D 13/20* (2016.01)
*F03D 80/50* (2016.01)
*F03D 80/80* (2016.01)

(52) U.S. Cl.
CPC ............. *F03D 13/20* (2016.05); *F03D 80/50* (2016.05); *F03D 80/82* (2016.05); *F03D 80/88* (2016.05);
(Continued)

(58) Field of Classification Search
CPC .......... F03D 13/20; F03D 80/82; F03D 80/88; F03D 80/50; F05B 2240/916;
(Continued)

(56) References Cited

U.S. PATENT DOCUMENTS

| 4,266,911 A | * | 5/1981 | Helm | ...................... F03D 13/20 416/9 |
| 7,805,893 B2 | * | 10/2010 | Scholte-Wassink | .... F03D 80/82 52/40 |

(Continued)

FOREIGN PATENT DOCUMENTS

| CN | 206290376 U | 6/2017 | |
| WO | WO-2015078476 A1 | * 6/2015 | ............. F03D 80/82 |

OTHER PUBLICATIONS

Extended European Search Report dated Mar. 21, 2018 for Application No. 17189236.7.

*Primary Examiner* — Adriana Figueroa
(74) *Attorney, Agent, or Firm* — Schmeiser, Olsen & Watts LLP

(57) ABSTRACT

Wind turbine, having a tower and a nacelle mounted rotatably around a center axis of the tower on top of the tower, the tower having at least one tower lift for transportation and/or at least one tower climbing means, in particular a ladder, for climbing between the bottom of the tower and at least one tower platform inside the tower which allows access to an access arrangement for the nacelle, characterized in that the access arrangement includes an access platform suspended below a bed frame of the nacelle and rotatable with the nacelle and an access climbing means, in particular stairs, and/or an access lift leading from the access platform to an interior of the nacelle.

14 Claims, 5 Drawing Sheets

(52) U.S. Cl.
CPC ....... *F05B 2230/61* (2013.01); *F05B 2240/14* (2013.01); *F05B 2240/221* (2013.01); *F05B 2240/912* (2013.01); *F05B 2240/916* (2013.01)

(58) Field of Classification Search
CPC .......... F05B 2240/912; F05B 2240/221; F05B 2230/61; F05B 2240/14
See application file for complete search history.

(56) References Cited

U.S. PATENT DOCUMENTS

| | | | | |
|---|---|---|---|---|
| 8,274,170 B2* | 9/2012 | Kassner | ................. | F03D 80/00 290/55 |
| 8,647,065 B2* | 2/2014 | Hanisch | ................. | F03D 13/20 416/146 R |
| 8,839,586 B2* | 9/2014 | Edenfeld | ................. | E04H 12/34 52/651.07 |
| 9,394,887 B2* | 7/2016 | Roer | ................. | F03D 80/00 |
| 9,416,511 B2* | 8/2016 | Kramer | ................. | F03D 80/50 |
| 9,611,837 B2* | 4/2017 | Abolfazlian | ................. | F03D 1/00 |
| 9,624,906 B2 | 4/2017 | Pineda Amo | | |
| 9,816,489 B2* | 11/2017 | Venkatakrishnappa | ...................... | F03D 80/50 |
| 9,869,293 B2* | 1/2018 | Nielsen | ................. | F03D 80/82 |
| 10,138,865 B2* | 11/2018 | Larsen | ................. | B65G 47/04 |
| 2007/0007074 A1* | 1/2007 | Lemburg | ................. | E04G 3/30 182/128 |
| 2007/0296220 A1* | 12/2007 | Kristensen | ................. | F03D 13/10 290/55 |
| 2008/0272604 A1* | 11/2008 | Versteegh | ................. | F03D 1/0666 290/55 |
| 2011/0084491 A1 | 4/2011 | Kassner | | |
| 2011/0248506 A1* | 10/2011 | Ruiz Urien | ................. | F03D 80/88 290/55 |
| 2013/0299277 A1* | 11/2013 | Kyatham | ................. | E06C 9/02 182/129 |
| 2014/0219812 A1 | 8/2014 | Abolfazlian | | |
| 2016/0069099 A1 | 3/2016 | Ohlen et al. | | |
| 2016/0252079 A1* | 9/2016 | Ollgaard | ................. | F03D 80/00 52/745.17 |
| 2017/0022979 A1* | 1/2017 | Teichert | ................. | F03D 80/00 |
| 2017/0051722 A1* | 2/2017 | Knoop | ................. | F03D 7/0204 |
| 2017/0240393 A1* | 8/2017 | Hansen | ................. | F03D 9/11 |
| 2017/0241410 A1* | 8/2017 | Hansen | ................. | F03D 13/10 |

* cited by examiner

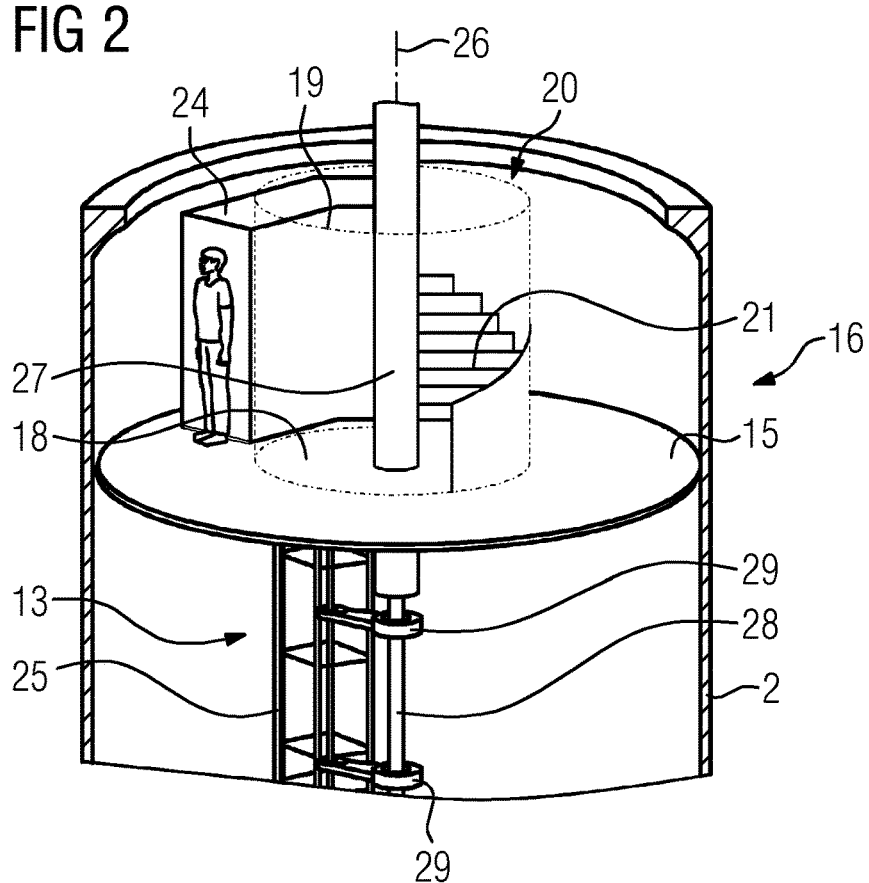
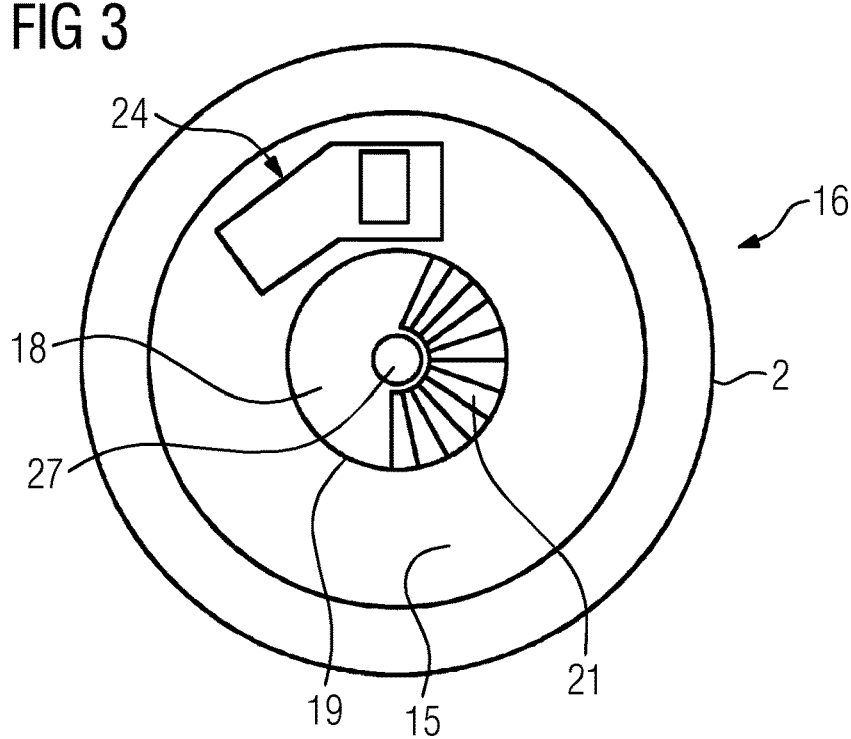

WIND TURBINE HAVING AN ACCESS ARRANGEMENT FOR A NACELLE

CROSS-REFERENCE TO RELATED APPLICATIONS

This application claims priority European application No. EP17189236 having a filing date of Sep. 4, 2017, the entire contents of which are hereby incorporated by reference.

FIELD OF TECHNOLOGY

The following relates to a wind turbine, having a tower and a nacelle mounted rotatably around a centre axis of the tower on top of the tower, the tower having at least one tower lift for transportation between the bottom of the tower and at least one tower platform inside the tower which allows access to an access arrangement for the nacelle, and/or at least one tower climbing means, in particular a ladder, for climbing between the bottom of the tower and the at least one tower platform.

BACKGROUND

Wind turbines producing electric power are already known in the state of the art. These wind turbines usually comprise components which may require maintenance and/or repair. For maintenance personal to access components located in the nacelle, it is known to provide climbing means, for example ladders, inside the tower on top of which the nacelle is rotatably mounted, such that a person can enter the nacelle on top of the tower using a corresponding access arrangement of the nacelle. Nacelles usually comprise a bed frame on which further components of the nacelle, for example the generator or a yaw drive for rotating (or re-orientating) the nacelle, may be mounted. The nacelle may also comprise a canopy defining a nacelle interior.

As already explained, usually access to the nacelle of a wind turbine is done via the tower. To accommodate this, a ladder may extend from the base of the tower all the way to the bed frame of the nacelle. Preferably, however, a service platform is placed below the bed frame within the top tower section, where one person can enter from a lift extending from the bottom of the tower. The tower lift can be a wire connected lift that may be mast-guided, or a rack and pinion type lift, wherein both these systems rely on an internal support structure, for example a pole or a mast, in particular a lattice mast. Access to the nacelle from this tower platform is then normally provided using a ladder, as the stationary lift cannot extend into the rotatably mounted nacelle.

However, using a ladder to climb up from a service platform to the bed frame of the nacelle is disadvantageous. First of all, it is complicated for persons wishing to access the nacelle, for example maintenance personal, to carry additional items, for example tools, with them. Additionally, when climbing the ladder from the service platform, harness equipment is needed since it is mandatory when climbing ladders. Finally, lifting loads into the nacelle can be a sophisticated task.

SUMMARY

An aspect relates to facilitating access to the nacelle for persons and in particular also loads.

According to embodiments of the invention, the access arrangement of a wind turbine as initially described comprises an access platform suspended below a bed frame of the nacelle and rotatable with the nacelle, and an access climbing means, in particular stairs, and/or an access lift leading from the access platform to an interior of the nacelle.

Preferably, the access platform is on the same level as at least one of the at least one tower platform. Embodiments of the invention thus provides an access platform, in particular on the same level as at least one tower platform, that can be easily stepped on from at least one of the at least one tower platform, facilitating access to the nacelle. In a preferred embodiment, the access arrangement comprises stairs as access climbing means and/or an access lift, while a tower lift is provided inside the tower. In this manner, no harness equipment mandatory when climbing ladders is required and a person seeking to enter the nacelle interior always has at least one hand free for supporting equipment and/or load. Since also entering the access platform is provided as straightforward and easy as possible, changing from the tower platform to the access platform also poses no relevant problem.

In summary, embodiments of the invention provide access to the nacelle via an access platform connected to, but suspended below, the bed frame of the nacelle. Accordingly, the access platform is rotatable and follows the yaw movement of the nacelle on top of the tower. The access arrangement is primarily based within the tower and may be partly extending out about the bed frame. It is noted that since the access platform is rotatable with the nacelle, it can also be termed "yaw platform".

The distance between the lower surface of the nacelle body, i.e. the bed frame, and the upper surface of the access platform is preferably at least 2 meters, allowing a person to stand up in full height. Thus, a sufficient height between floor and ceiling is provided to facilitate access to the nacelle interior.

In preferred embodiments, the access platform can be at least essentially circular and/or be surrounded by at least one of the at least one tower platform. As most towers are conically-shaped or cylindrical, thus also have a circular cross section, the geometry of the access platform may advantageously be chosen as to optimally exploit the power geometry. In this context, it is preferred to use spiral stairs/stair cases as climbing means, as this best exploits the curvature or in general geometry of the usually conically-shaped or cylindrical tower and/or access arrangement.

In a preferred embodiment, the access arrangement comprises a safety barrier means, in particular a safety wall, at the outer boundary of the access platform, surrounding the access platform, the safety barrier means having at least one access means, in particular a door and/or a hatch, to access the access platform from one of the at least one tower platforms in at least one orientation of the nacelle. The safety barrier means may be, in particular if the access platform is circular, at least essentially cylindrical. For safety reasons, the access platform may preferably be shielded from the surroundings and the tower platform, but is accessible via an opening in the safety barrier means (which may also be termed "shield"). The opening may preferably be sealed using a door or a hatch. The safety barrier means is preferably extending from the floor, i.e. the upper surface of the access platform, to the ceiling, i.e. the bottom surface of the bed frame, and/or may be cylindrical in shape. While the safety barrier means is preferably provided as a safety wall, it may also be provided as, for example, bars and/or a fence.

Preferably, the safety barrier means acts as a supporting element of the access platform. In this embodiment, the safety barrier means may function as the connection means between the bed frame and the access platform, in particular supporting/carrying the access platform at least partly. As a supporting element, the safety barrier means extends at least from the upper surface of the access platform to the lower surface of the bed frame. Additionally or alternatively other supporting elements, for example beams and/or poles, can, of course, be used.

In an embodiment, it may be provided that the access platform is at least partly supported by the first tower platform via a friction reduction device. While the access platform is preferably hanging freely suspended below the bed frame, it can in principle also rest partly or in total on the tower platform from which it can be accessed. Then, the bottom surface of the access platform is configured to glide freely on the corresponding tower platform using friction reduction devices, which may for example comprise at least one roller and/or at least one friction pad.

Preferably, the centre of the access platform may comprise guiding and/or supporting means for at least one connecting cable of the nacelle. Usually, connection cables extend from the nacelle to, for example, the base of the tower. Such cables may comprise electrical cables and/or communication cables. It is preferred to guide these cables along the centre axis of the tower and thus the rotation axis of the yaw movement of the nacelle, since the fewest movement occurs there. Since the access arrangement is preferably arranged in the centre section of the tower, suitable guiding and/or supporting means for these cables can be provided.

In a first major alternative embodiment of the invention, the tower climbing means and/or the tower lift end at the tower platform being at the same level as the access platform. In this first major embodiment, the lift and/or climbing means of the tower land next to the access platform on the same level. This means that one tower platform in principle is sufficient. The tower climbing means and/or the tower lift are arranged off-centre, meaning that, for example, an internal tower pole or mast for the lift is placed near the inner surface of the tower wall and not along the centre axis, such that a person can reach above the tower platform, but clear of the access platform.

The wind turbine may further comprise a control device for controlling a yawing device (and therefore an orientation around the centre axis) of the nacelle, such that, if the access arrangement comprises a safety barrier means as described above, the control device can be configured to rotate the nacelle to a new orientation when the access means is blocked by the tower lift. Depending on the tower section diameter, to access the access platform, some yawing of the nacelle (and thus the safety barrier means/the access platform) may be required, for example, if the access means/entry point is blocked by the tower lift. Thus the yawing means may be controlled to change orientation of the nacelle such that service personal can enter the access platform, preferably before the personal even enters the tower. It is noted that wind turbines have already been proposed in which there will be sufficient clearance between the tower lift and the safety barrier means to allow passage of a person, such that yawing of the nacelle may not be required.

Some conditions in the nacelle, for example a fire, might require fast evacuating of the nacelle such that people are safe from the adverse conditions of the nacelle necessitating the evacuation. As, however, tower lifts and/or tower climbing means usually only accommodate one or two persons at a time, persons remaining on the access platform or the tower platform on which the tower lift/tower climbing means land, might still be in danger, despite providing, for example, safety barrier means.

Therefore it is preferred that the tower further comprises a safety compartment for at least one person arranged below the tower platform and accessible from the tower platform. A safety compartment, for example a box and/or a room, can be placed below the tower platform levelled with the access platform, wherein persons can seek shelter and, preferably, also have access to escape means, for example using an internal ladder (provided additionally to the lift) and/or a support structure for the tower lift, for example a pole or mast. Therefore, the safety compartment is preferably placed next to such climbing equipment so that it can be reached easily by a person. Access to the safety compartment can be provided using a permanent ladder and/or pole, but may also be provided via a telescopic ladder placed within the safety compartment. The safety compartment can be mounted to a tower wall or be suspended below the tower platform, thus hanging freely below the tower platform.

In a preferred second major embodiment two tower platforms connected by a climbing means for persons, in particular stairs and/or a ladder, are provided, wherein a first, higher level tower platform provides access to the access platform and a second, lower level platform is reached from the tower lift and/or the tower climbing means. In this second alternative major embodiment of the invention, the tower lift and/or tower climbing means is landing below the access platform. Thus, access to the first tower platform and therefore the access platform is provided via a second stationary tower platform placed below the first tower platform. Using this approach, the access platform cannot be directly entered, but it is allowed to place the tower lift and/or tower climbing means centred in the tower. For example, an internal tower pole or mast for the tower lift can be placed in or close to the centre of the tower, in particular along the centre axis. Generally speaking, the support structure, in particular a pole, column or mast, supporting the tower climbing means and/or the tower lift can be provided along the centre axis. This allows additional usage of the support structure, for example to guide connection cables or the like for the nacelle to the tower base. In addition, generally in this second major embodiment, more room is available for the tower lift and/or the tower climbing means, in particular facilitating their use and increasing comfort for service and maintenance personal. A further advantage of having the access platform separated in height from the landing point using the second tower platform is that the second tower platform can function as a temporary escape platform should adverse conditions, for example a fire, develop within the nacelle. Thus, a safety compartment as discussed in the first major embodiment is not required.

Depending on the concrete design of the climbing means for a person connecting the first and second tower platforms, some yawing of the nacelle might, also in this embodiment, be required to access the access platform if access means of a safety barrier means are provided, but the rotation required is less than in the design of the first major embodiment. As discussed above, a control device may command a yawing device to move the nacelle into a required orientation. As mentioned above, in towers having a sufficiently high diameter at the top, the first tower platform may be dimensioned large enough to leave a space for a person passing between the climbing means for a person connecting the first and second tower platforms and the access platform.

Also in this case, the climbing means for a person connecting the first and second tower platforms is preferably a staircase, in particular a winding staircase, such that not ladder and thus not harness equipment is needed and loads, tools and the like can safely and easily be carried in at least one free hand.

In many maintenance and/or service measures, transportation of loads, for example spare parts and/or tools, into and/or from the nacelle is required. Thus, in a generally preferred embodiment, a hoisting device for hoisting a load between the nacelle interior and at least one of the at least one tower platform and/or the tower lift is provided in the nacelle. Such a hoisting means can, for example, be an internal crane of the nacelle. Due to the usage of the different platforms and/or the presence of the bed frame of the nacelle, to facilitate the lifting and lowering of payloads into and from the nacelle, passage means can preferably be provided in the bed frame and/or any platform passed by the load, in particular hatches and/or openings. Thus, for example, a hatch or opening can be provided as passage means in the bed frame in the first major embodiment, while it may be expedient to provide such passage means as hatches and/or openings in both the bed frame and the first tower platform and/or the access platform in the above described second major embodiment. That means, passed platforms can in particular comprise the access platform and/or the first tower platform.

In a preferred embodiment, when the access platform is passed by hoisted load, a hoisting compartment not accessible from the access platform or a tower platform on the same level as the access platform extends from the access platform to the bed frame of the nacelle. Such a hoisting compartment which is in particular sort of a cut-out of a room provided atop the access platform, increases safety when hoisting load and using the access arrangement for access to the nacelle interior by persons. In particular, the hoisting compartment is delimited by some sort of barrier, for example walls, regarding the tower platform and the access platform, and preferably has openings as passage means in the access platform and/or the tower platform as well as in the bed frame, while the latter can preferably comprise a hatch to close the opening to the hoisting compartment, which can also be termed "safety case".

Preferably, a spiral staircase is used as access climbing means and/or, if provided, climbing means for a person connecting the first and second tower platforms in the second major embodiment. Opposed to using a ladder, the use of a spiral staircase (winding staircase) is much safer when entering into the nacelle, and service and/or maintenance personal have at least one hand free to safely carry tools and/or equipment. If a spiral staircase is used as access climbing means, preferably at least one electric (comprising electronic) component of the nacelle can be arranged in a space below the spiral staircase. For example, electrical cabinets can be placed in the free space beneath the spiral staircase.

BRIEF DESCRIPTION

Some of the embodiments will be described in detail, with reference to the following figures, wherein like designations denote like members, wherein:

FIG. 2 shows a perspective view of a top of a tower of the wind turbine of FIG. 1;

FIG. 3 shows a cross-sectional view of the top of the tower;

DETAILED DESCRIPTION

Figure 1:
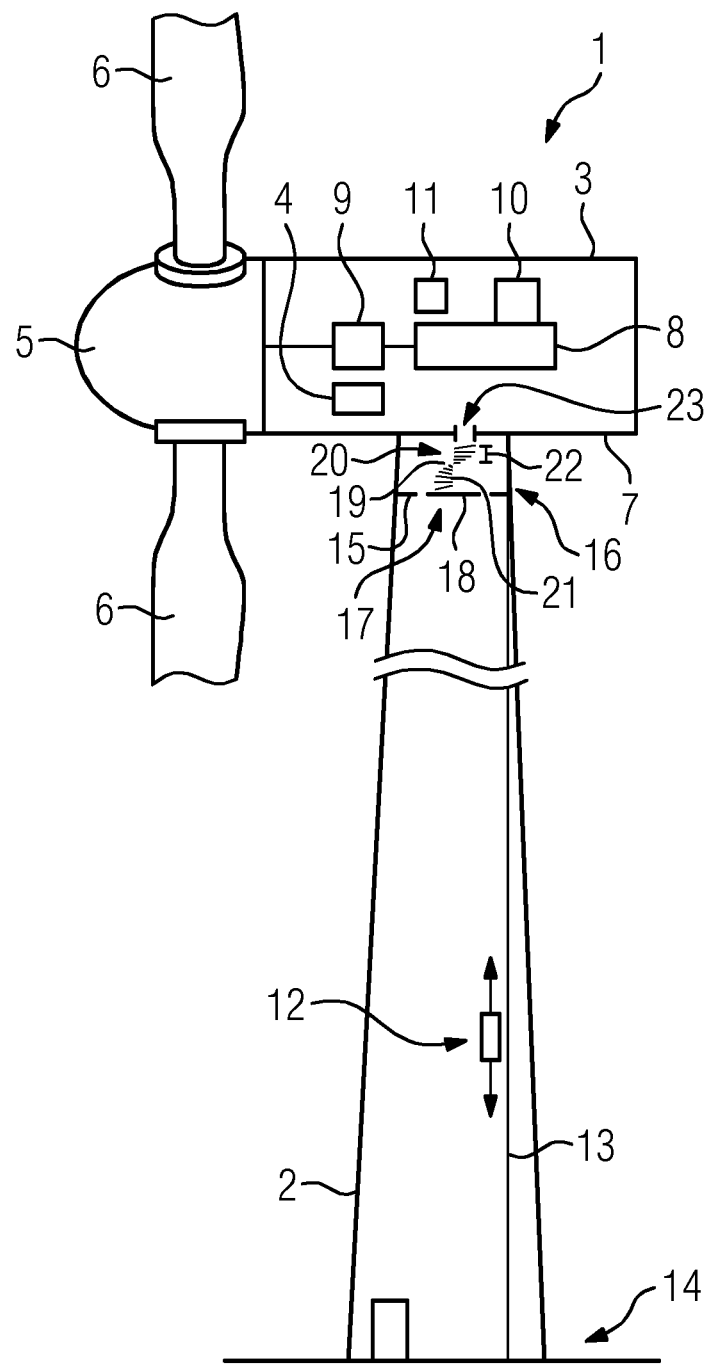
FIG. 1 shows a schematic cross-sectional view of a first embodiment of a wind turbine.

FIG. 1 is a schematical cross-sectional view of a wind turbine 1 according to the first major embodiment of the invention. Not all possible components of the wind turbine 1 are shown, but can of course be provided as known in the state of the art. The wind turbine 1 comprises a tower 2 on top of which a nacelle 3 is mounted rotatably in a yawing direction so as to be able to adapt to a wind direction. A yawing device 4 controlled by a control device (not shown) can be provided to adjust the orientation of the nacelle 3. The yawing device 4 can comprise a yaw drive.

Connected to the nacelle 3 is a hub 5 to which blades 6 of the wind turbine 1 are mounted.

The nacelle 3 comprises a bed frame 7 which supports components of the nacelle 3, which comprise, besides the yawing device 4, the exemplarily depicted generator 8, brake means 9, electrical cabinets 10 as well as a hoisting device 11 which will be further explained below.

Service and/or maintenance personal may wish to enter the nacelle interior for example for maintenance and/or repairs. The nacelle interior can be reached via the interior of the tower 2, where a tower lift 12 comprising a corresponding support structure 13, for example a pole and/or a lattice mast, is provided which connects a tower base 14 to a tower platform 15 located in the top section 16 of the tower 2. The nacelle comprises an access arrangement 17, which in turn has an access platform 18 suspended from the bed frame 7 of the nacelle 3 on the same level as the tower platform 15 on which the tower lift 12 lands. In this case, the access platform 18 is supported or carried by safety barrier means 19 provided as a wall extending from the top surface of the access platform 18 to the bottom surface of the bed frame 7 along the boundary of the access platform 18, thus enclosing an access chamber in which an access climbing means of the access arrangement 17, in this case a spiral staircase 21, is placed. To access this access chamber, access means 22 are provide in the safety barrier means 19, in particular a hatch and/or a door.

The access climbing means 20 may lead to an opening and/or hatch 23 in the bed frame 7 such that the interior of the nacelle 3 can be entered from the access chamber.

In some embodiments, when there is limited space for the tower platform 15, the access means 22 may be blocked by the tower lift 12 in some orientations of the nacelle 3. In these cases, the yawing device 4 is controlled by the control device to change the orientation of the nacelle 3, in particular prior to persons entering the wind turbine 1.

FIG. 2 shows a perspective view of the top section 16 of the tower 2. The safety barrier means 19 is only indicated to provide insight into the access chamber. The landing area 24 of the lift 12 is, as the whole tower platform 15 surrounding the access arrangement 17, provided off-centre, such that the support structure 13, in this case a lattice mast 25, is also provided off-centre with an offset to the centre axis 26 around which the nacelle 3 is rotatable.

The access climbing means 20, as explained a spiral staircase 21, is supported by a central column 27 which also serves as guiding and supporting means for connection cables 28 from the nacelle 3 to the base 14 of the tower 2 along the centre axis 26, wherein, in this first major embodiment, additional guiding means 29 are provided extending from the lattice mast 25.

FIG. 3 shows a corresponding horizontal cross-sectional view of this top section.

Figure 4:
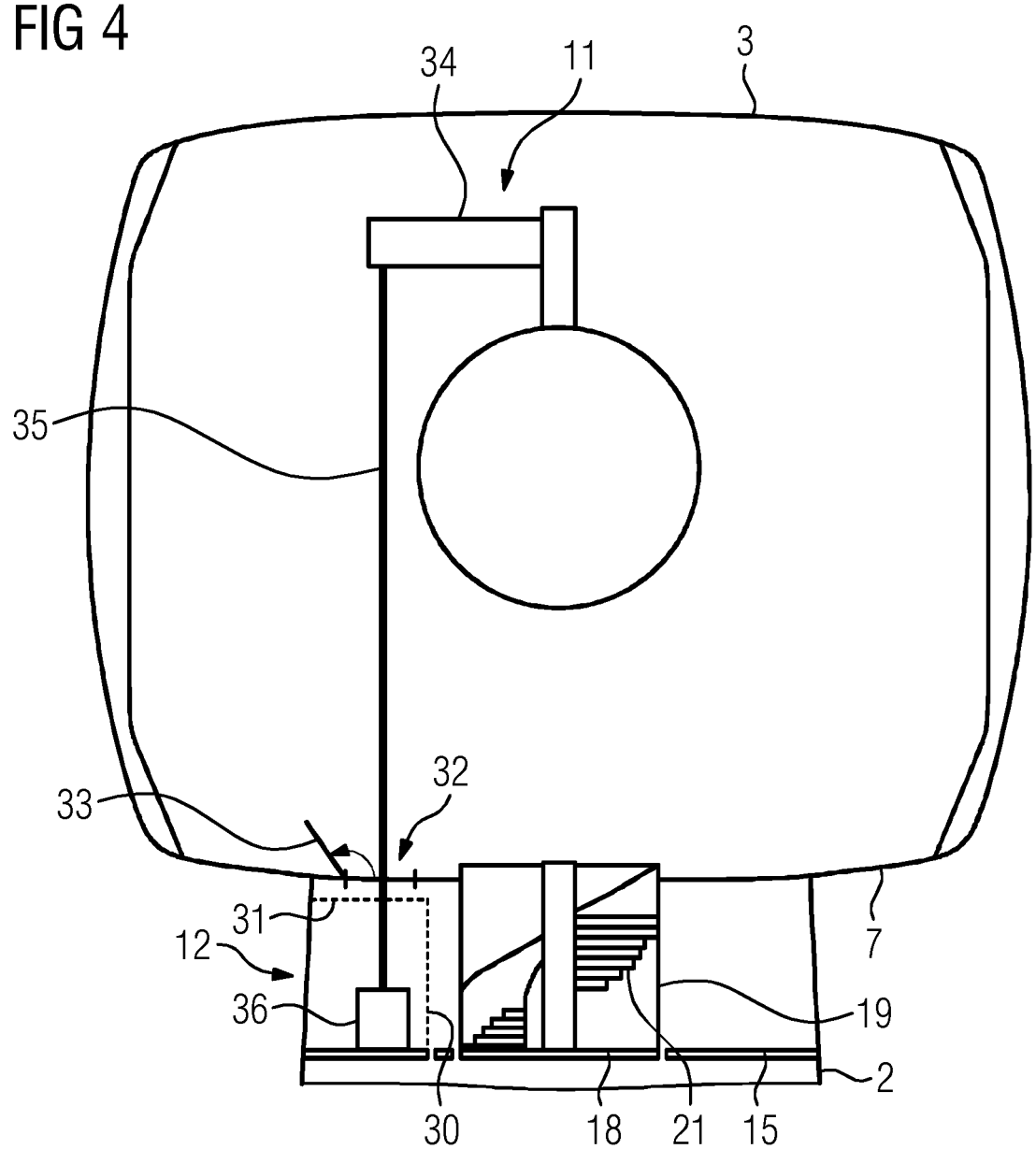
FIG. 4 shows a cross-sectional view illustrating the lifting of loads into a nacelle of the wind turbine of FIG. 1.

FIG. 4 shows how a load 36 can be hoisted into the interior of the nacelle 3 and/or lowered from the interior of the nacelle 3. This can be done directly from the lift 12, which in this case has a cabin 30 with an open top 31. The bed frame 7 has an opening 32 which in at least one orientation can be positioned above the landing zone 24 of the tower lift 12 and may be closed by a hatch 33 for safety reasons. The hoisting device 11 in this case is a crane 34 mounted to another component housed in the nacelle 3 which has a hoisting cable 35 configured to be attached to a load 36 which can thus be transported between the nacelle 3 and the lift 12. It is, of course, also possible to hoist loads from and to the tower platform 15 or, in a less preferred version, from the access platform 18.

Of course, multiple openings 32 may be provided corresponding to different orientations of the nacelle 3 and the crane 34 may be correspondingly adjustable.

Figure 5:
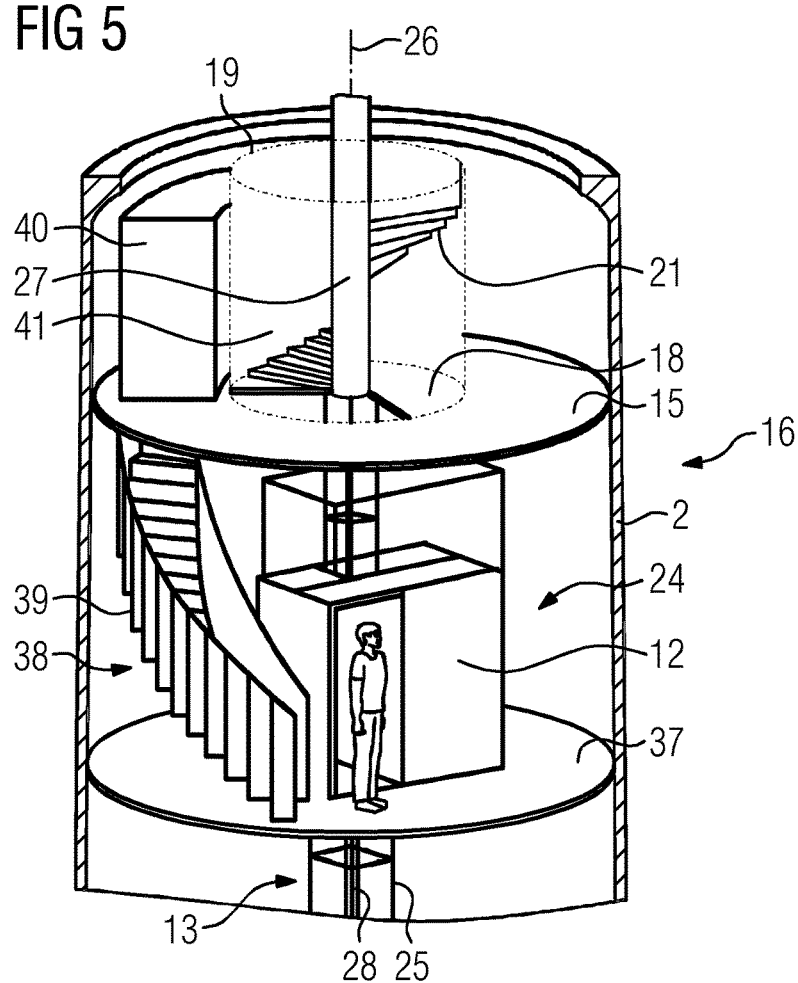
FIG. 5 shows the top of a tower of a second embodiment of a wind turbine.
Figure 6:
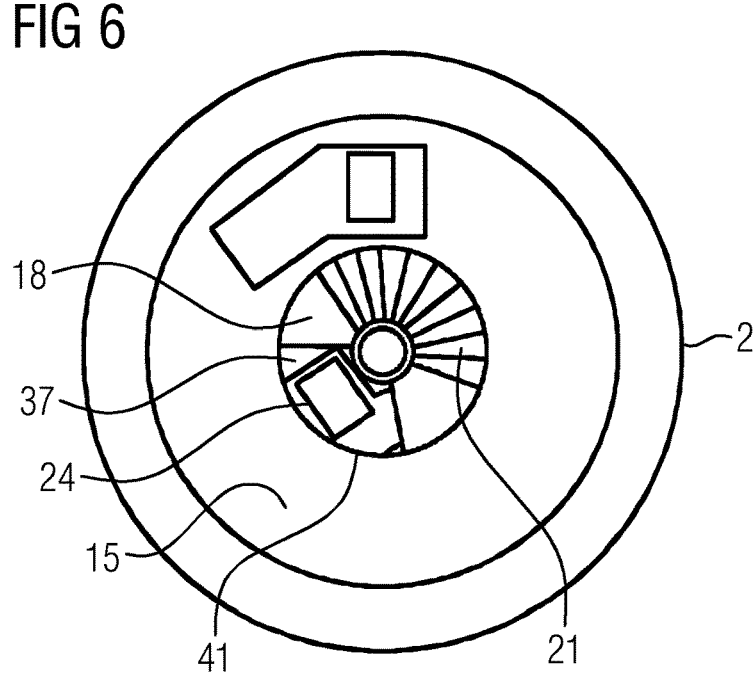
FIG. 6 shows a cross-sectional view of the top of the tower in FIG. 5.

In the following, an example of the second major embodiment having two tower platforms is described, wherein, for simplicity, the same reference numerals are used for corresponding elements. FIGS. 5 and 6 correspond essentially to FIGS. 2 and 3, while FIG. 7 explains the hoisting of loads 36.

As can be seen from FIG. 5, which again shows the top section 16 of the tower 2 in the second major embodiment, again a first tower platform 15 is provided on the same level as the access platform 18, wherein again the preferred spiral staircase 21 is used as the access climbing means 20. However, the landing zone 24 of the lift 12 is now on a second tower platform 37 arranged below the first tower platform 15. A connection climbing means 38, again a spiral staircase 39, for persons connects the first tower platform 15 and the second tower platform 37. Again, should the landing zone 40 of the spiral staircase 39 block access to the access platform 18 via the access means of the safety barrier means 19 (shown transparent for purposes of presentation), the nacelle 3 can be rotated to a different orientation using the yawing device 4.

The provision of two tower platforms 15, 37, allows placing the tower lift 12 in the centre of the tower 2, such that the support structure 13, in this case the lattice mast 25, may extend along the central axis 26, serving as a guiding means for the connection cables 28. A further advantage of this arrangement is that the second tower platform 37 can function as a temporary escape platform or shelter should adverse conditions occur in the nacelle 3, for example fire.

As can best be seen from the horizontal cross-section view of FIG. 6, the access arrangement 17 also comprises a hoisting compartment 41 as a cut-out of the access platform 18 and the correspondingly formed access chamber. The hoisting compartment 41 is separated from the access chamber and the surrounding first tower platform 15 by walls, open at the bottom to the cabin 31 of the tower lift 12, which is also open at the top, and also open to the top, meaning the bed frame 7, which can comprise a hatch to open a hoisting path into the interior of the nacelle 3.

Figure 7:
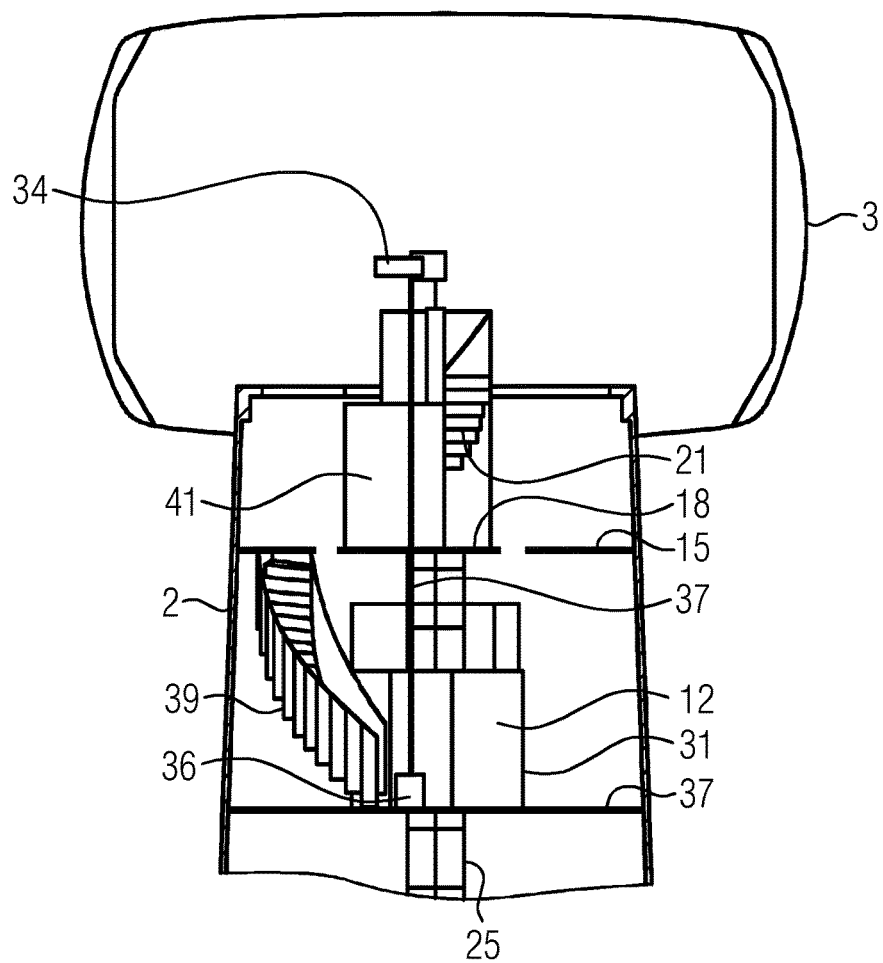
FIG. 7 illustrates the lifting of loads into a nacelle of the wind turbine of FIG. 5.

This can best be seen from FIG. 7 illustrating the hoisting process analogously to FIG. 4.

Figure 8:
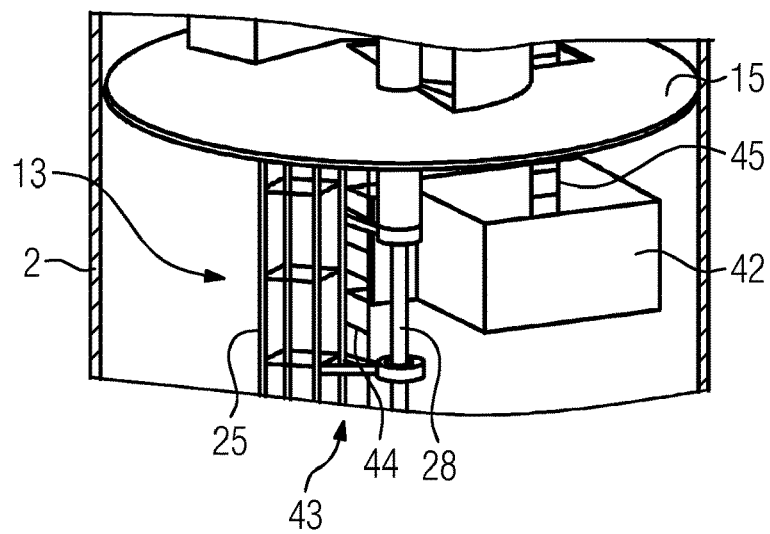
FIG. 8 illustrates the provision of a safety compartment of the wind turbine of FIG. 1.

FIG. 8, finally, again relates to the first major embodiment and shows how a safety compartment 42 can be suspended below the tower platform 15. A person can seek shelter in the safety compartment 42 below the tower platform 15 in case of emergency, in particular adverse conditions in the nacelle interior 3 extending to the area above the tower platform 15. As can be seen, the safety compartment 42 also extends to a tower climbing means 43, in this case a ladder 44, provided redundantly to the tower lift 12. Thus, persons in the safety compartment 42 can reach the ladder 44 and climb down.

It is finally noted that a tower lift 12 is preferably provided as means to reach a corresponding tower platform 15, 37 from the base 14 of the tower 2.

The access climbing means 20 and (in the second major embodiment) connection climbing means 38 are preferably provided as stairs, in particular spiral staircases 21, 39, which are best adapted to the cylindrical/circular geometry of the tower 2 and the access arrangement 17. However, also a lift can be used in the access arrangement 17 (access lift). Ladders are preferably only provided as emergency climbing means, like for example in FIG. 8 the ladder 44 and the ladder 45 for entering the safety compartment 42.

It is finally noted that free space beneath the spiral staircase 21 in the access arrangement 17 can be used to place electric components, for example electric cabinets.

Although the present invention has been described in detail with reference to the preferred embodiment, the present invention is not limited by the disclosed examples from which the skilled person is able to derive other variations without departing from the scope of the invention.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A wind turbine comprising:
    a tower;
    a nacelle mounted rotatably around a center axis of the tower on top of the tower;
    at least one tower lift for transportation and/or at least one tower climbing structure for climbing between a bottom of the tower and at least one tower platform inside the tower;
    an access arrangement located within the tower for accessing an interior of the nacelle, the access arrangement being accessible from the at least one tower platform,
    wherein the access arrangement comprises an access platform suspended below a bed frame of the nacelle and rotatable with the nacelle and an access climbing structure, and/or an access lift leading from the access platform to the interior of the nacelle;
    wherein the access platform glide freely with respect to the tower platform and the tower platform remains stationary.

2. The wind turbine according to claim 1, wherein the access platform is on a same level as at least one of the at least one tower platform.

3. The wind turbine according to claim 1, wherein the access arrangement comprises a safety barrier at an outer boundary of the access platform, surrounding the access platform, the safety barrier having at least one access structure to access the access platform from the tower platform in at least one orientation of the nacelle.

4. The wind turbine according to claim 3, wherein the safety barrier acts as a supporting element of the access platform.

5. The wind turbine according to claim 1, wherein the access platform is configured to be supported at least partly by the tower platform.

6. The wind turbine according to claim 1, wherein the tower climbing structure and/or the tower lift end at the tower platform being at the same level as the access platform.

7. The wind turbine according to claim 6, further comprising a control device for controlling a yawing device of the nacelle and the access arrangement comprises a safety barrier, wherein the control device is configured to rotate the nacelle to a new orientation when an access structure is blocked by the tower lift.

8. The wind turbine according to claim 6, wherein the tower further comprises a safety compartment for at least one person arranged below the tower platform and accessible from the tower platform.

9. The wind turbine according to one of claim 1, wherein the at least one tower platform comprises two tower platforms connected by a climbing structure for persons, wherein a first, higher level tower platform provides access to the access platform and a second, lower level platform is reached from the tower lift and/or tower climbing structure.

10. The wind turbine according to claim 9, wherein a support structure supporting the tower climbing structure and/or the tower lift, is provided along the center axis.

11. The wind turbine according to claim 1, wherein a hoisting device for hoisting a load between the nacelle interior and at least one of the at least one tower platform and/or the tower lift is provided in the nacelle.

12. The wind turbine according to claim 11, wherein a passage is provided in the bed frame and/or any platform passed by the load.

13. The wind turbine according to claim 12, further comprising a hoisting compartment that is not accessible from the access platform, wherein, when the access platform is passed by hoisted load, the hoisting compartment extends from the access platform to the bed frame of the nacelle.

14. The wind turbine according to claim 1, wherein a spiral staircase is used as the access climbing structure, wherein at least one electric component of the nacelle is arranged in a space below the spiral staircase.

* * * * *